(12) United States Patent
Hirabayashi

(10) Patent No.: US 10,899,905 B2
(45) Date of Patent: Jan. 26, 2021

(54) MILLABLE SILICONE RUBBER COMPOSITION, MILLABLE SILICONE RUBBER SPONGE, AND METHOD FOR PRODUCING SAID SPONGE

(71) Applicant: Shin-Etsu Chemical Co., Ltd., Tokyo (JP)

(72) Inventor: Satao Hirabayashi, Annaka (JP)

(73) Assignee: SHIN-ETSU CHEMICAL CO., LTD., Tokyo (JP)

( * ) Notice: Subject to any disclaimer, the term of this patent is extended or adjusted under 35 U.S.C. 154(b) by 78 days.

(21) Appl. No.: 16/306,990

(22) PCT Filed: Jun. 27, 2017

(86) PCT No.: PCT/JP2017/023615
§ 371 (c)(1),
(2) Date: Dec. 4, 2018

(87) PCT Pub. No.: WO2018/003811
PCT Pub. Date: Jan. 4, 2018

(65) Prior Publication Data
US 2020/0347201 A1 Nov. 5, 2020

(30) Foreign Application Priority Data
Jun. 30, 2016 (JP) ................................. 2016-129729

(51) Int. Cl.
*C08J 9/32* (2006.01)
*C08J 9/10* (2006.01)
(Continued)

(52) U.S. Cl.
CPC . *C08J 9/32* (2013.01); *C08J 7/08* (2013.01); *C08J 9/0023* (2013.01); *C08J 9/0028* (2013.01);
(Continued)

(58) Field of Classification Search
CPC . C08J 9/32; C08J 9/0023; C08J 9/0038; C08J 9/103; C08J 9/106; C08J 7/08;
(Continued)

(56) References Cited

U.S. PATENT DOCUMENTS 6,300,384 B1 * 10/2001 Baba .......................... C08J 9/10
521/54
2001/0016609 A1 8/2001 Meguriya et al.
(Continued)

FOREIGN PATENT DOCUMENTS

JP 8-12795 A 1/1996
JP 8-12797 A 1/1996
(Continued)

OTHER PUBLICATIONS

Translation of JP 2003-001660 by Sawada et al. (Year: 2003).*
(Continued)

*Primary Examiner* — Michael M Dollinger
*Assistant Examiner* — Christina H. W. Rosebach
(74) *Attorney, Agent, or Firm* — Birch, Stewart, Kolasch & Birch, LLP

(57) ABSTRACT

A method for producing a millable silicone rubber sponge is a method for producing a millable silicone rubber sponge with an open cell ratio of not lower than 20%, comprising:
performing a heat treatment on a silicone rubber composition at 200° C. or higher, the silicone rubber composition containing:
(A) an organopolysiloxane having at least two alkenyl groups in one molecule and a polymerization degree of not lower than 3,000;
(B) a reinforcing silica;
(C) thermally expandable microcapsules exhibiting an expansion starting temperature of 90 to 150° C., and contracting from a maximum expansion volume by 20% or more when heated at 200° C. for 5 min;
(Continued)

(D) a curing agent; and (E) an open cell-forming agent which is a solid high temperature decomposition-type organic foaming agent having a decomposition starting temperature of not lower than. 180° C., and starting to decompose after the component (A) is cured.

11 Claims, 1 Drawing Sheet

(51) Int. Cl.
| | |
|---|---|
| C08J 9/00 | (2006.01) |
| C08K 3/36 | (2006.01) |
| C08K 5/14 | (2006.01) |
| C08K 5/20 | (2006.01) |
| C08K 5/3467 | (2006.01) |
| C08K 9/10 | (2006.01) |
| E06B 7/23 | (2006.01) |
| B29C 71/02 | (2006.01) |

(52) U.S. Cl.
CPC ............... *C08J 9/103* (2013.01); *C08J 9/106* (2013.01); *C08K 3/36* (2013.01); *C08K 5/14* (2013.01); *C08K 5/20* (2013.01); *C08K 5/3467* (2013.01); *C08K 9/10* (2013.01); *E06B 7/2314* (2013.01); *C08J 2201/026* (2013.01); *C08J 2203/22* (2013.01); *C08J 2205/05* (2013.01); *C08J 2383/07* (2013.01)

(58) Field of Classification Search
CPC .......... C08J 2205/05; C08K 3/36; C08K 5/20; C08K 5/3467; C08K 9/10; E06B 7/2314
See application file for complete search history.

(56) References Cited

U.S. PATENT DOCUMENTS

| | | |
|---|---|---|
| 2002/0028736 A1 | 3/2002 | Kishino et al. |
| 2013/0072584 A1 | 3/2013 | Gopalan et al. |

FOREIGN PATENT DOCUMENTS

| | | | |
|---|---|---|---|
| JP | 8-12800 A | 1/1996 | |
| JP | 8-12888 A | 1/1996 | |
| JP | 2001-220510 A | 8/2001 | |
| JP | 2001-295830 A | 10/2001 | |
| JP | 2002-70838 A | 3/2002 | |
| JP | 2003-1660 A | 1/2003 | |
| JP | 2016-52691 A | 4/2016 | |

OTHER PUBLICATIONS

Translation of CN 106349709 by Kan et al. (Year: 2017).*
International Search Report (PCT/ISA/210) issued in PCT/JP2017/023615, dated Sep. 26, 2017.
Extended European Search Report dated Jan. 15, 2020, in European Patent Application No. 17820165.3.

* cited by examiner

MILLABLE SILICONE RUBBER COMPOSITION, MILLABLE SILICONE RUBBER SPONGE, AND METHOD FOR PRODUCING SAID SPONGE

TECHNICAL FIELD

The present invention relates to a millable silicone rubber composition; a millable silicone rubber sponge; and a method for producing such sponge by forming open cells.

BACKGROUND ART

A silicone rubber sponge is a sponge superior in, for example, heat resistance, cold resistance, electrical insulation and flame retardancy that are unique to silicone rubbers; and exhibiting a superior physical property such as a small compression set. Silicone rubber sponges having such properties are used in the fields of, for example, OA equipments, automobiles and architectural materials for the purpose of achieving a lower thermal conductivity and reducing weights.

Depending on its intended purpose, a silicone rubber sponge can be produced by varying methods such as a molding and crosslinking method and a foaming method for a silicone rubber. As a foaming method, there is known a method for obtaining a sponge by adding to a rubber composition thermally expandable resin fine particles (thermally expandable microcapsules) with a solvent encapsulated therein. In this method, the thermally expandable microcapsules expand as the solvent inside the thermally expandable microcapsules vaporizes when heated. That is, the particle size of the expanded thermally expandable microcapsules (resin microballoons) corresponds to size of sponge cells.

The specific gravity of a silicone rubber sponge can also be reduced by employing a large amount of the above thermally expandable microcapsules. However, in such case, a resin component(s) of the thermally expandable microcapsules will remain in the rubber of the silicone rubber sponge obtained, which causes the hardness of the sponge obtained to increase significantly, and the rubber elasticity thereof to be impaired. That is, the problem is that it has been difficult to produce a thick sponge due to the larger compression set of the silicone rubber sponge.

Further, a crosslinking agent for use in a silicone rubber sponge may be selected from addition-crosslinking agents or organic peroxide crosslinking agents. Normally, an addition-crosslinking agent exhibiting a favorable surface crosslinkability is often selected if performing hot air vulcanization (abbreviated as HAV hereunder); whereas an organic peroxide is often selected if allowing crosslinking to take place in a mold (Patent documents 1 and 2). The sponge cells formed by methods using these crosslinking agents are closed cells.

As a method for turning the cells in a thermally expandable microcapsule-containing sponge into open cells, there have been proposed methods employing, as an open cell-forming agent, a polyalcohol, an inorganic acid salt, a metallic soap, an organic tin compound or the like (Patent documents 3 to 5). In each of these methods, expanded microballoons are already contained in an addition-crosslinking type liquid silicone, and a liquid or an ionic substance is used as an open cell-forming agent. Thus, the open cell-forming agent needs to be eliminated via a heating step other than the step of heating (curing) the silicone rubber, and such heating step is performed at a temperature different from the temperature employed in the step of heating (curing) the silicone rubber. Therefore, even the above methods employing crosslinking agents and open cell-forming agents lead to deterioration in the properties of a silicone rubber sponge.

PRIOR ART DOCUMENT

Patent Documents

Patent document 1: JP-A-Hei-8-012888
Patent document 2: JP-A-Hei-8-012795
Patent document 3: JP-A-2001-220510
Patent document 4: JP-A-2002-070838
Patent document 5: JP-A-2001-295830

SUMMARY OF THE INVENTION

Problem to be Solved by the Invention

Therefore, it is an object of the present invention to provide a silicone rubber sponge exhibiting a small compression set without impairing properties inherent to a silicone rubber, and having a uniform fine-cell structure containing open cells at a high ratio, while the density of such silicone rubber sponge can be adjusted throughout a wide range from that associated with a low foaming ratio to that associated with a high foaming ratio by using a thermally expandable microcapsule(s) as a foaming agent; and a method for producing such silicone rubber sponge.

Means to Solve the Problem

The inventors of the present invention diligently conducted a series of studies, and completed the invention as follows. That is, the inventors found a method capable of turning a millable silicone rubber into an open cell sponge by only performing the general HAV step. This method is made possible by adding to a heat-curable millable silicone rubber composition a solvent-containing unexpanded microcapsule(s) heat-expandable and -shrinkable at a particular temperature, and then using a solid high temperature decomposition-type organic foaming agent as an open cell-forming agent after the rubber is cured. Further, the inventors found that the millable silicone rubber sponge produced by this method could have its density adjusted throughout a wide range from that associated with a low foaming ratio to that associated with a high foaming ratio; and that this millable silicone rubber sponge was rich in elasticity, had a skin layer with an excellent surface smoothness as well as a superior dimension accuracy after foaming, and exhibited a uniform fine-cell structure.

That is, the present invention is to provide the following millable silicone rubber sponge and a method for producing the same.

[1]
A method for producing a millable silicone rubber sponge with an open cell ratio of not lower than 20%, comprising:
performing a heat treatment on a silicone rubber composition at 200° C. or higher, the silicone rubber composition containing:
(A) 100 parts by mass of an organopolysiloxane having at least two alkenyl groups in one molecule and a polymerization degree of not lower than 3,000, the organopolysiloxane being represented by the following average composition formula (I)

wherein $R^1$ represents an identical or different monovalent hydrocarbon group, and a represents a positive number of 1.95 to 2.04;

(B) a reinforcing silica in an amount of 10 to 100 parts by mass per 100 parts by mass of the component (A);

(C) thermally expandable microcapsules exhibiting an expansion starting temperature of 90 to 150° C., and contracting from a maximum expansion volume by 20% or more when heated at 200° C. for 5 min, the thermally expandable microcapsules being in an amount of 0.1 to 20 parts by mass per 100 parts by mass of the component (A);

(D) a curing agent which is an organic peroxide in an amount of 0.01 to 20 parts by mass per 100 parts by mass of the component (A); and (E) an open cell-forming agent which is a solid high temperature decomposition-type organic foaming agent having a decomposition starting temperature of not lower than 180° C., and starting to decompose after the component (A) is cured, the open cell-forming agent being in an amount of 0.1 to 30 parts by mass per 100 parts by mass of the component (A).

[2]

The method for producing the millable silicone rubber sponge according to [1], wherein the heat treatment is performed with atmospheric hot air.

[3]

The method for producing the millable silicone rubber sponge according to [1] or [2], wherein an amount of a gas generated by the open cell-forming agent as the component (E) is not smaller than 100 cc per 100 g of a sum total of the components (A) and (B).

[4]

The method for producing the millable silicone rubber sponge according to any one of [1] to [3], wherein the open cell-forming agent (E) comprises at least one selected from azodicarbonamide, N,N'-dinitrosopentamethylenetetramine and hydrazodicarbonamide.

[5]

The method for producing the millable silicone rubber sponge according to any one of [1] to [4], wherein the curing agent (D) is a dialkyl-based organic peroxide having a crosslinking starting temperature (6-min half-life temperature) of 135 to 180° C.

[6]

A millable silicone rubber sponge with an open cell ratio of not lower than 20%, a cell aspect ratio of 1.0 to 1.3 and an average cell diameter of not larger than 250 μm, the millable silicone rubber sponge being a heat-treated product of a silicone rubber composition containing:

(A) 100 parts by mass of an organopolysiloxane having at least two alkenyl groups in one molecule and a polymerization degree of not lower than 3,000, the organopolysiloxane being represented by the following average composition formula (I)

$$R^1{}_a SiO_{4-a/2} \quad (I)$$

wherein $R^1$ represents an identical or different monovalent hydrocarbon group, and a represents a positive number of 1.95 to 2.04;

(B) a reinforcing silica in an amount of 10 to 100 parts by mass per 100 parts by mass of the component (A);

(C) thermally expandable microcapsules exhibiting an expansion starting temperature of 90 to 150° C., and contracting from a maximum expansion volume by 20% or more when heated at 200° C. for 5 min, the thermally expandable microcapsules being in an amount of 0.1 to 20 parts by mass per 100 parts by mass of the component (A);

(D) a curing agent which is an organic peroxide in an amount of 0.01 to 20 parts by mass per 100 parts by mass of the component (A); and (E) an open cell-forming agent which is a solid high temperature decomposition-type organic foaming agent having a decomposition starting temperature of not lower than 180° C., and starting to decompose after the component (A) is cured, the open cell-forming agent being in an amount of 0.1 to 30 parts by mass per 100 parts by mass of the component (A).

[7]

A belt-shaped molded product comprising the millable silicone rubber sponge as set forth in [6].

[8]

A sheet-shaped molded product comprising the millable silicone rubber sponge as set forth in [6].

[9]

A sponge roller-shaped molded product comprising the millable silicone rubber sponge as set forth in [6].

[10]

A protective buffer material for transportation carriers, comprising the millable silicone rubber sponge as set forth in [6].

[11]

A millable silicone rubber composition containing:

(A) 100 parts by mass of an organopolysiloxane having at least two alkenyl groups in one molecule and a polymerization degree of not lower than 3,000, the organopolysiloxane being represented by the following average composition formula (I)

$$R^1{}_a SiO_{4-a/2} \quad (I)$$

wherein $R^1$ represents an identical or different monovalent hydrocarbon group, and a represents a positive number of 1.95 to 2.04;

(B) a reinforcing silica in an amount of 10 to 100 parts by mass per 100 parts by mass of the component (A);

(C) thermally expandable microcapsules exhibiting an expansion starting temperature of 90 to 150° C., contracting from a maximum expansion volume by 20% or more when heated at 200° C. for 5 min, and having a contraction temperature of not lower than 200° C., the thermally expandable microcapsules being in an amount of 0.1 to 20 parts by mass per 100 parts by mass of the component (A);

(D) a curing agent which is an organic peroxide having a crosslinking starting temperature of 100 to 180° C., the curing agent being in an amount of 0.01 to 20 parts by mass per 100 parts by mass of the component (A); and (E) an open cell-forming agent which is a solid high temperature decomposition-type organic foaming agent having a decomposition starting temperature of not lower than 180° C., the open cell-forming agent being in an amount of 0.1 to 30 parts by mass per 100 parts by mass of the component (A), wherein the components (A) to (E) satisfy: the expansion starting temperature of the component (C)<the crosslinking starting temperature of the component (D)<the contraction temperature of the component (C)≤the decomposition starting temperature of the component (E).

Effects of the Invention

By the production method of the present invention, there can be produced a silicone rubber sponge capable of having its density adjusted throughout a wide range from that associated with a low foaming ratio to that associated with a high foaming ratio, being rich in elasticity, having a skin layer with an excellent surface smoothness as well as a superior dimension accuracy after foaming, and exhibiting a uniform fine-cell structure. Thus, the silicone rubber sponge of the invention is useful in, for example, a sponge roller, a belt and a sheet.

MODE FOR CARRYING OUT THE INVENTION

Figure 1:
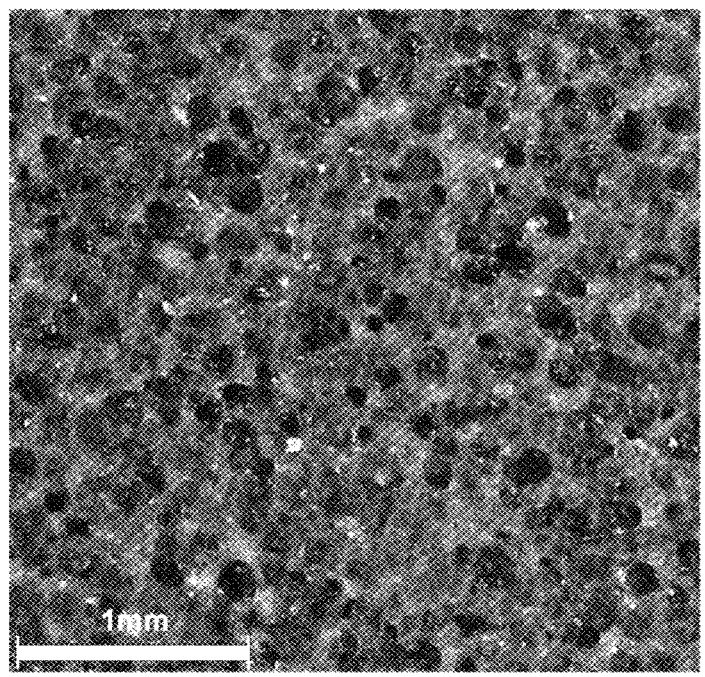
FIG. 1 is an enlarged photograph of a sponge cross-section of working example 1.

The present invention is described in detail hereunder.

At first, the constituent components of the millable silicone rubber composition and millable silicone rubber sponge of the present invention are described; and a method for producing the present invention is described as well.

The invention is characterized by employing a millable silicone rubber composition prepared by adding to an alkenyl group-containing organopolysiloxane (A), a reinforcing silica (B) for imparting a strength to a silicone rubber; a particular thermally expandable microcapsule(s) (C) used to form sponge cells; a curing agent (D) for curing the component (A); and a solid high temperature decomposition-type open cell-forming agent (E) for turning the sponge cells into open cells by generating a gas after the silicone rubber is cured.

Next, with regard to the method of the invention, described is a chronology of events as the temperature of the above rubber composition rises.

In the beginning, the thermally expandable microcapsules as the component (C) expand at 90 to 150° C., and foam in the components (A) and (B).

Next, the curing agent as the component (D) generates radicals at 120 to 170° C., thereby crosslinking the component (A), and allowing the sponge cells to be formed.

Later, the thermally expandable microcapsules as the component (C) start to contract at 180 to 210° C. such that gaps are formed between the outer shell resins of the contracted thermally expandable microcapsules and sponge cells.

In addition, when the temperature has reached a range of 180 to 250° C., the open cell-forming agent as the component (E) will decompose to generate a large amount of gas which will then be discharged outside the sponge while turning the sponge cells into open cells. Meanwhile, as oxygen enters the sponge from the outside, the residual resin of the contracted thermally expandable microcapsules as the component (C) will be degraded by oxidation. The formation of open cells allows all the residual resin in the sponge to be degraded by oxidation, thereby achieving an unimpaired heat resistance, and making it possible to obtain a silicone rubber sponge having a heat resistance inherent to silicone. Moreover, a sequence of these reactions can be performed via one step called HAV.

Each component is described in detail hereunder.

—Component (A)—

The organopolysiloxane as the component (A) is an organopolysiloxane having at least two alkenyl groups in one molecule and a polymerization degree of not lower than 3,000, the organopolysiloxane being represented by the following average composition formula (I)

$$R^1_a SiO_{4-a/2} \quad (I)$$

[In the formula (I), $R^1$ represents an identical or different monovalent hydrocarbon group; a represents a positive number of 1.95 to 2.04.]

In the average composition formula (I), $R^1$ may be an identical or different monovalent hydrocarbon group preferably having 1 to 12 carbon atoms, more preferably having 1 to 8 carbon atoms. Specific examples thereof include alkyl groups such as a methyl group, an ethyl group, a propyl group, a butyl group, a hexyl group and a dodecyl group; cycloalkyl groups such as a cyclohexyl group; alkenyl groups such as a vinyl group, an allyl group, a butenyl group and a hexenyl group; aryl groups such as a phenyl group and a tolyl group; and aralkyl groups such as β-phenylpropyl group. Here, a part of or all the carbon atom-bonded hydrogen atoms in any of these groups may be substituted with halogen atoms; examples of $R^1$ in which a part of or all of its carbon atom-bonded hydrogen atoms have been substituted with halogen atoms include a chloromethyl group and a trifluoropropyl group. Among the above examples, a methyl group, a vinyl group, a phenyl group and a trifluoropropyl group are preferred as $R^1$. Especially, it is preferred that not less than 80%, more preferably not less than 95% of $R^1$ be methyl groups. Further, "a" represents a positive number of 1.95 to 2.04; this organopolysiloxane is substantially linear, but may also be branched provided that the rubber elasticity of the silicone rubber sponge after curing will not be impaired. This organopolysiloxane may be that having its molecular chain end(s) blocked by, for example, a trimethylsilyl group, dimethylvinylsilyl group, dimethylhydroxysilyl group or trivinylsilyl group. However, in the present invention, it is required that this organopolysiloxane have at least two alkenyl groups per molecule; specifically, it is preferred that 0.001 to 5%, particularly 0.05 to 0.5% of $R^1$ be alkenyl groups, especially vinyl groups.

The organopolysiloxane as the component (A) can be obtained by hydrolyzing and condensing at least one kind of an organohalosilane(s) that is normally selected, or by performing ring-opening polymerization of a cyclic polysiloxane (e.g. trimer of tetramer of siloxane) with an alkaline or acidic catalyst. The organopolysiloxane thus obtained is basically a linear diorganopolysiloxane, but may also be partially branched. Further, the organopolysiloxane as the component (A) may also be a mixture of two or more kinds thereof with different molecular structures.

Moreover, it is preferred that the polymerization degree of this organopolysiloxane be not lower than 3,000, and not higher than 100,000; and it is preferred that a range thereof be 6,000 to 10,000. Here, polymerization degree refers to a value obtained as an average polymerization degree based on a number average molecular weight in terms of polystyrene in a gel permeation chromatography (GPC) analysis using toluene as a developing solvent.

—Component (B)—

The reinforcing silica as the component (B) is a component required to improve, for example, the workability and mechanical strength of the silicone rubber sponge; it is preferred that the specific surface area of such reinforcing silica be not smaller than 50 m²/g, more preferably 100 to 400 m²/g. Examples of this reinforcing silica include a fumed silica (dry silica) and a precipitated silica (wet silica), among which a fumed silica (dry silica) is preferred. Further, the reinforcing silica as the component (B) may have its surface already hydrophobized with organopolysiloxane, organopolysilazane, chlorosilane, alkoxysilane or the like.

Any one kind of these silicas may be used singularly, or two or more kinds of them may be used in combination.

This reinforcing silica is added in an amount of 10 to 100 parts by mass, preferably 10 to 70 parts by mass, and particularly preferably 20 to 50 parts by mass, per 100 parts by mass of the organopolysiloxane as the component (A). When this reinforcing silica is added in an amount as extremely small as less than 10 parts by mass, a sufficient reinforcement effect cannot be achieved; when this reinforcing silica is added in an amount of larger than 100 parts by mass, the workability of the silicone rubber sponge may be impaired, the physical properties of the silicone rubber sponge obtained may be impaired, and the silicone rubber composition before crosslinking may exhibit a significantly high viscosity such that it may be difficult for the composition to be turned into a sponge.

—Component (C)—

The component (C) which is a thermally expandable microcapsule(s) exhibiting an expansion starting temperature of 90 to 150° C., and contracting from its maximum expansion volume by 20% or more when heated at 200° C. for 5 min, is a component for forming cells in the sponge of the present invention.

Examples of such thermally expandable microcapsules include those having, as outer shells, a thermoplastic resin such as polyvinylidene chloride, polyacrylonitrile and a vinylidene chloride-acrylonitrile copolymer, and containing thereinside a solvent (hydrocarbon-based solvent such as isobutane, isopentane and n-hexane). In the case of the thermally expandable microcapsules as the component (C), the thermoplastic resin as the outer shells softens by heat, and the solvent contained thereinside nearly simultaneously vaporizes to cause each thermally expandable microcapsule to be expanded into the shape of a balloon (thermally expandable microcapsules that have expanded are referred to as resin microballoons hereunder). That is, by heating and thus curing a silicone rubber composition containing such microcapsules, there can be obtained a silicone rubber sponge having thereinside spherical sponge cells formed by the resin microballoons.

In the present invention, unexpanded thermally expandable microcapsules are contained in the silicone rubber composition. It is preferred that the outer shells of the unexpanded thermally expandable microcapsules be made of, for example, polyacrylonitrile resin and/or vinylidene chloride-acrylonitrile copolymer resin that exhibit a high hardness and strength at ordinary temperature, such that the outer shells will not be destroyed even when kneading the silicone rubber composition containing the microcapsules with a double roll mill or the like. It is preferred that the molecular weight of such polyacrylonitrile resin or vinylidene chloride-acrylonitrile copolymer resin be 500,000 to 5,000,000, more preferably 1,000,000 to 2,000,000. Here, molecular weight refers to a value obtained as a number average molecular weight in terms of polystyrene in a gel permeation chromatography (GPC) analysis using THF as a developing solvent. However, if the silicone rubber composition contains expanded resin microballoons, the resin microballoons will be destroyed when performing kneading due to the thinness of the balloon walls of the resin microballoons, and the solvent thereinside will thus leak out, which makes it impossible to obtain a sponge with a desired foaming ratio, and which leads to abnormal foaming due to the solvent. Thus, it is not appropriate to use the expanded resin microballoons in the present invention.

Further, it is preferred that the solvent contained inside the unexpanded thermally expandable microcapsules be, for example, a linear or branched aliphatic hydrocarbon having 3 to 8 carbon atoms, or an aliphatic hydrocarbon having 3 to 8 carbon atoms, specific examples of which include isobutane, isopentane, n-hexane, cyclohexane and mixtures thereof. It is preferred that the unexpanded thermally expandable microcapsules contain the solvent by an amount of 10 to 30% by mass with respect to the total mass of the thermally expandable microcapsules.

In contrast to a case where an organic foaming agent is used, the usage of the thermally expandable microcapsules allows the softening point of the thermoplastic resin as the outer shells and the boiling point of the solvent to be controlled, thereby making it possible to arbitrarily regulate the expansion starting temperature of the thermally expandable microcapsules and the maximum expansion diameter thereof. In addition, by adjusting the amount of the solvent contained and a pre-expansion particle size of the thermally expandable microcapsules, the volume of the resin microballoons after expansion can be arbitrarily controlled.

In this way, it is possible to prevent the breakage of the cells and the breakage of the sponge that are caused by abnormal foaming and outgassing, thus allowing there to be easily obtained a silicone rubber sponge having a skin layer superior in surface smoothness.

In the present invention, the "pre-expansion particle size" of the thermally expandable microcapsules refers to an average particle size of the thermally expandable microcapsules before expansion that is measured as a weight average value (or median size), using a particle size distribution measurement device employing a laser diffraction method or the like. It is preferred that such pre-expansion particle size be 10 to 70 μm. If such pre-expansion particle size is smaller than 10 μm, the amount of the solvent contained will be smaller such that there may not be achieved a desired sponge foaming ratio; if such pre-expansion particle size is larger than 70 μm, there will be obtained a sponge having coarse sponge cells.

The "expansion starting temperature" and an "expansion ending temperature" of the thermally expandable microcapsules are values determined by the following procedure.

(1) The unexpanded thermally expandable microcapsules placed in a glass bottle are heated in a dryer at various temperatures (60 to 250° C.) for 5 min each, and then left to cool at ordinary temperature for 30 min.

(2) The sizes (particle sizes) of the thermally expandable microcapsules before and after heating (expanding) are both measured by an optical microscope. The sizes here are measured in a way such that the sizes of an arbitrary number of the microcapsules are measured at first, followed by calculating an average value thereof.

(3) An expansion ratio is calculated based on the particle sizes before and after expansion. Specifically, the expansion ratio refers to a ratio of a volume calculated based on the particle size after expansion to a volume calculated based on the particle size before expansion, in which the volume calculated based on the particle size before expansion is thus regarded as 1.

(4) After plotting a correlation between the temperature (temperature used for the 5-min heating) and the expansion ratio, it is clear that the expansion ratio rises as the temperature rises, and that the expansion ratio reaches a maximum value at a certain temperature, but decreases thereafter.

Based on such correlation between the temperature and the expansion ratio, a 5-min heating temperature at which the expansion ratio had increased five times or more was determined as the "expansion starting temperature" of the thermally expandable microcapsules.

In the present invention, the expansion starting temperature is 90 to 150° C., preferably 100 to 140° C., more preferably 110 to 130° C.

When the expansion starting temperature is lower than 90° C., foaming will take place at an extremely early timing such that the thermoplastic resin as the outer shells of the resin microballoons will contract before the crosslinking of the silicone rubber composition, thus making it impossible to obtain uniform cells, and possibly leading to a larger high-temperature compression set in the sponge obtained. When the expansion starting temperature is greater than 150° C., the thermally expandable microcapsules will expand and foaming will thus begin after the crosslinking of the silicone rubber composition, thereby preventing the foaming ratio from rising, and resulting in a significantly disfigured sponge due to large pinholes that have occurred.

Further, based on the above correlation between the temperature and the expansion ratio, a 5-min heating temperature at which the expansion ratio had reached a maximum value (maximum expansion ratio) was determined as the "expansion ending temperature" of the thermally expandable microcapsules, such 5-min heating temperature being also referred to as "maximum expansion temperature" in the present invention. In this invention, it is preferred that the maximum expansion ratio be not less than 20 and not more than 150, more preferably not less than 30 but less than 120. If the maximum expansion ratio is less than 20, a sufficient foaming ratio cannot be achieved; if the maximum expansion ratio is greater than 150, the thermoplastic resin as the outer shells will become thinner such that the cells will easily break prior to the crosslinking of the silicone rubber composition at the time of expansion, thus making it difficult to obtain uniform and fine cells.

Here, the size of the thermally expandable microcapsules (resin microballoons) at the expansion ending temperature is defined as "maximum expansion diameter;" and the volume of the thermally expandable microcapsules (resin microballoons) at the expansion ending temperature that is calculated based on the aforesaid maximum expansion diameter is defined as "maximum expansion volume."

In the present invention, a "contraction temperature" is defined as follows. That is, the resin microballoons that have reached the maximum expansion volume at the expansion ending temperature are further heated at an arbitrary temperature higher than the expansion ending temperature for 5 min. There, a heating temperature at which the resin microballoons contract from the maximum expansion volume by 20% is defined as the "contraction temperature."

Although the contraction of the resin microballoons by heat depends on the properties of the thermoplastic resin as the outer shells, the contraction temperature in this invention is not lower than 200° C., preferably not lower than 190° C., more preferably not lower than 180° C.

In the present invention, the open cell-forming agent as the component (E) is used to highly turn the sponge cells into open cells after the thermally expandable microcapsules were used to trigger foaming, and the component (D) was used to crosslink the component (A). Thus, it is required that the resin microballoons quickly contract after silicone rubber crosslinking. For this reason, it is preferred that the resin microballoons be those significantly contracting when heated continuously at a temperature not lower than 200° C., as the contraction temperature, in the air. It is not preferable if the thermoplastic resin as the outer shells has a high heat resistance i.e. the contraction temperature of the resin microballoons is high, because the thermoplastic resin as the outer shells will remain without undergoing contraction in a way such that the sponge cells cannot be turned into open cells by the open cell-forming agent, but will only remain as closed cells.

Therefore, the thermally expandable microcapsules of the invention are such that by heating the thermally expandable microcapsules that have reached the maximum expansion ratio at 200° C. for 5 min, such microcapsules will then contract from the maximum expansion volume by not less than 20%, more preferably not less than 30%.

A volume contraction ratio is defined as follows. That is, after putting the thermally expandable microcapsules that have reached the maximum expansion ratio into a glass bottle, the glass bottle is then heated in a dryer at 200° C. for 5 min. There, the volume contraction ratio is defined as a ratio of the volume of the contracted thermally expandable microcapsules occupying the glass bottle after heating to the volume of the thermally expandable microcapsules occupying the glass bottle before heating in which the volume of the thermally expandable microcapsules occupying the glass bottle before heating is regarded as 100. For example, if the volume of the thermally expandable microcapsules occupying the glass bottle has contracted to 70 after being heated at 200° C. for 5 min, then the contraction ratio is 30%.

The component (C) is added in an amount of 0.1 to 20 parts by mass, preferably 0.3 to 10 parts by mass, more preferably LO to 5.0 parts by mass, per 100 parts by mass of the polyorganosiloxane as the component (A). If the amount of the component (C) added is smaller than 0.1 parts by mass, a sufficient foaming ratio cannot be achieved; if the amount of the component (C) added is greater than 20 parts by mass, the silicone rubber sponge will lack rubber elasticity such that a molded product will break easily when deformed by, for example, compression, and a mechanical strength will significantly decrease as well due to an increased resin component(s) remaining in the rubber.

—Component (D)—

The curing agent as the component (D) is a component for curing the organopolysiloxane as the component (A). In the present invention, an organic peroxide is used as the curing agent of the component (D). The organic peroxide may simply be such a type capable of curing the component (A). However, since it is required that the crosslinking (curing) of the component (A) be initiated after the thermally expandable microcapsules as the component (C) have expanded, preferred are organic peroxides capable of curing the component (A) by heating at 100 to 180° C. as a crosslinking starting temperature for about 3 min, such as peroxy ester, peroxy ketal, dialkyl peroxide and hydroperoxide. Particularly preferred is a dialkyl-based organic peroxide having a crosslinking starting temperature (6-min half-life temperature) of 135 to 180° C.

Further, in the present invention, an addition-crosslinking type curing agent employing platinum as a catalyst is not appropriate, because the skin layer on the silicone rubber sponge surface will be formed in early stages of HAV, which makes it difficult to turn the sponge cells into open cells.

Specific and preferable examples of the alkyl-based organic peroxide include (also shown in the brackets are 6-min half-life temperature of each compound): 2,5-dimethyl-2,5-di-(t-butylperoxy)hexane (dialkyl-based, 160° C.); 2,5-dimethyl-2,5-di-(t-butylperoxy)-3-hexine (dialkyl-based, 174° C.); di-t-butylperoxide (dialkyl-based, 167° C.); dicumylperoxide (dialkyl-based, 154° C.); and cumyl-t-butylperoxide (dialkyl-based, 148° C.), among which a dialkyl peroxide preferably having a 6-min half-life temperature of 135 to 180° C., more preferably 140 to 170° C., and even more preferably 150 to 165° C. is favorable in terms of, for example, stability of organic peroxide. Any one kind of these organic peroxides may be used singularly, or two or more kinds of them may be used in a mixed manner.

The organic peroxide as the curing agent of the component (D) is added in an amount of 0.01 to 20 parts by mass, preferably 0.5 to 15 parts by mass, per 100 pans by mass of the organopolysiloxane as the component (A). If such amount of the organic peroxide added is smaller than 0.01 parts by mass, the component (A) cannot be cured sufficiently, even if the organic peroxide is added in an amount of greater than 20 parts by mass, not only there will not be achieved any further special effects, but a long period of time will be required for heating so as to eliminate the unreacted products and decomposition residues of the curing agent, which may then negatively impact the properties of the silicone rubber obtained.

—Component (E)—

The open cell-forming agent as the component (E) is a gas-generating component for creating holes in cell walls after forming the sponge cells, and differs in function from a gas component derived from the solvent in the component (C) for forming the sponge cells. Thus, as the open cell-forming agent of the component (E), the present invention employs a solid high temperature decomposition-type organic foaming agent (gas-generating agent) having a decomposition starting temperature of not lower than 180° C. It is required that the component (E) start generating gas at a temperature higher than a temperature at which the organopolysiloxane as the component (A) starts curing. That is, the component (E) needs to decompose and generate gas at a temperature higher than a temperature at which the organic peroxide as the component (D) starts decomposing and crosslinking. Thus, the component (E) is limited to a solid high temperature decomposition-type organic foaming agent having a decomposition starting temperature of not lower than 180° C. The decomposition starting temperature (gas-generating temperature) of the open cell-forming agent as the component (E) is not lower than 180° C., preferably not lower than 190° C., and more preferably not lower than 200° C. There are no particular restrictions on the type of the open cell-forming agent so long as the decomposition starting temperature thereof is not lower than 180° C. Specific examples of such solid high temperature decomposition-type organic foaming agent include azodicarbonamide (decomposition starting temperature 210° C. in pure form); urea-containing azodicarbonamide (decomposition starting temperature 190° C. at purity of 95%); N,N'-dinitrosopentamethylenetetramine (decomposition starting temperature 205° C. in pure form); and hydrazodicarbonamide (decomposition starting temperature 245° C. in pure form).

The open cell-forming agent as the component (E) is added in an amount of 0.1 to 30 parts by mass, preferably 0.5 to 20 parts by mass, more preferably 2.0 to 10 parts by mass, per 100 parts by mass of the component (A). When such amount added is smaller than 0.1 parts by mass, there will be achieved an insufficient pressure and quantity of the gas generated such that the sponge cannot be turned into that having open cells; when such amount added is larger than 30 parts by mass, the decomposition residues of the open cell-forming agent may cause deterioration in silicone rubber properties.

In order to turn the silicone rubber sponge into that having open cells, it is required that the quantity of the gas generated by the decomposition of the open cell-forming agent as the component (E) be as large as or larger than the volume of the silicone rubber sponge itself. Specifically, the gas generation amount (theoretical gas generation amount) of the component (E) needs to be not smaller than 100 cc, preferably not smaller than 300 cc, more preferably not smaller than 500 cc, per 100 g of a sum total of the organopolysiloxane (A) and the reinforcing silica (B). For example, when the azodicarbonamide employed is in its pure form, a gas generation amount of about 200 cc per 1 g requires not less than 0.5 g of the pure azodicarbonamide per 100 g of the components (A)+(B).

In order for the sequence of the reactions regarding the foaming mechanism of the millable silicone rubber composition to take place via one step, it is preferred that the components (C) to (E) be those satisfying:

Expansion starting temperature of component (C)<Crosslinking starting temperature of component (D)<Contraction temperature of component (C)<Decomposition starting temperature of component (E).

Here, "Contraction temperature of component (C)≤Decomposition starting temperature of component (E)" is also allowable.

If these conditions are met, the sequence of the reactions regarding the foaming mechanism involving sponge cell formation and open cell formation is allowed to take place via one step called hot air vulcanization.

—Other Components—

In addition to the aforementioned components, the following components may also be added to the silicone rubber composition of the invention on the premise that the effects of the invention will not be impaired.

Dispersant

Examples of a dispersant include alkoxysilane, diphenylsilanediol, carbon-functional silane, and a low-molecular siloxane with both ends blocked by silanol groups. Here, a specific example of such low-molecular siloxane with both ends blocked by silanol groups may be a dimethylpolysiloxane having a silanol group at both ends, and exhibiting a viscosity at 23° C. of 10 to 100 mm$^2$/s, preferably 20 to 40 mm$^2$/s.

Semi-Reinforcing or Non-Reinforcing Filler Other than Reinforcing Silica as Component (B)

Examples of a semi-reinforcing and non-reinforcing fillers include a crushed silica, a diatom earth, a metal carboxylate, clay, talc, mica and titanium oxide.

Flame Retardant

Examples of a flame retardant include those that are usually added for flame retardant purposes, such as a platinum complex (e.g. chloroplatinic acid isopropylalcohol), titanium oxide, fired mica, and aluminum hydroxide. In the present invention, even when a large amount of such flame retardant is added, there can still be obtained a favorable fine sponge without negatively affecting sponge formation. That is, the aforesaid flame retardant is useful for producing a flame-retardant sponge.

Thermal Conductivity Imparting Agent

Examples of a thermal conductivity imparting agent include those that are usually added to a silicone rubber composition to impart a thermal conductivity thereto, such as crushed quartz, zinc oxide, aluminum oxide, a metallic silicon powder, silicon carbide and a fibrous carbon fiber.

Electric Conductivity Imparting Agent

Examples of an electric conductivity imparting agent include a conductive carbon and conductive metal oxide fine particles (conductive zinc oxide fine particles, conductive titanium oxide fine particles and conductive tin-antimony oxide fine particles). In the present invention, the sponge can also be turned into a conductive sponge by adding such electric conductivity imparting agent.

Further, there may also be added to the silicone rubber composition of the invention, for example, a heat resistance additive, an antioxidant and a processing aid. Furthermore, a ferrite powder or the like may also be added to the silicone rubber composition of the invention to make molding by high-frequency dielectric heating possible.

Although there are no particular restrictions on a method for producing the silicone rubber composition of the invention, there may be employed, for example, a method in which given amounts of the abovementioned components are kneaded by a double roll mill, a kneader, a Banbury mixer or the like. A heat treatment (kneading while heated) may also be performed if necessary. Specifically, there may be employed a method where a base rubber composition is at first obtained by kneading and heating the components (A) and (B) as well as other components that are added as appropriate, followed by cooling such base rubber composition and then adding the components (C), (D) and (E) thereto. Although there are no particular restrictions on a heat treatment temperature and time for preparing the above base rubber composition, the heat treatment temperature may be 100 to 250° C., and the heat treatment time may be 30 min to 5 hours.

A method for producing the millable silicone rubber sponge of the invention includes a step of heating the above silicone rubber composition at a temperature of not lower than 200° C. It is preferred that this heat treatment be performed at 200 to 400° C. for 1 min to 1 hour, more preferably at 220 to 250° C. for 10 to 30 min.

A silicone rubber sponge with a high open cell ratio can be obtained via such one step.

Further, the aforesaid heat treatment may be performed via several steps only when a heat treatment at a temperature of not lower than 200° C. is included. For example, a primary heat treatment is at first performed by heating the silicone rubber composition at 80 to 200° C., particularly at 100 to 200° C., for 1 min to 1 hour. Since the thermally expandable microcapsules as the component (C) expand, and the organopolysiloxane as the component (A) cures in such primary heat treatment, the primary heat treatment is also referred to as an expansion and curing step. Next, the silicone rubber composition that has been subjected to the primary heat treatment is subjected to a secondary heat treatment performed at 200 to 400° C. for 0.5 to 24 hours. Since the open cell-forming agent as the component (E) decomposes in such secondary heat treatment, the secondary heat treatment is also referred to as an open cell-forming step.

In addition to the above heat treatment(s), post-curing may also be performed at 200 to 250° C. for about 10 min to 10 hours in the method for producing the millable silicone rubber sponge of the invention. By performing a high-temperature treatment such as post-curing, the decomposition residues of the open cell-forming agent and curing agent as well as the thermoplastic resin residue of the outer shells of the thermally expandable microcapsules can be eliminated from the millable silicone rubber sponge of the invention.

The heat treatment in the method for producing the millable silicone rubber sponge of the invention i.e. a method for curing and foaming the millable silicone rubber composition is hot air vulcanization (HAV), since the open cell ratio of the sponge cells has to be improved. Hot air vulcanization may be performed in batches, or in a continuous manner. Specifically, the composition of the invention, after being molded by an arbitrary method, may be put into a batch-type dryer for hot air vulcanization; or the composition of the invention may be molded by extrusion molding, followed by sending the molded composition into a continuous dryer for hot air vulcanization via a conveyor belt. Hot air vulcanization also includes a powder curing method for performing foaming in heated glass beads. However, even in the case of allowing crosslinking to take place in a mold, if there is enough space in the mold so that an escapeway for the open cell-forming gas can be secured, the method for curing and foaming the millable silicone rubber composition does not necessarily have to be hot air vulcanization.

The silicone rubber sponge of the invention that is obtained by the above production method is characterized by having an open cell ratio of not lower than 20%, preferably 20 to 100%, more preferably 25 to 100%. Particularly, in the present invention, the open cell ratio refers to that measured by the following method.

Method for Measuring Open Cell Ratio (1) The specific gravities and masses of the silicone rubber composition (referred to as "rubber before foaming" hereunder) and the silicone rubber sponge (referred to as "sponge" hereunder) are measured. Here, the specific gravity measurement is carried out by a method described in JIS K 6268:1998, provided that a water immersion time when performing such specific gravity measurement is within 5 sec.

(2) The sponge is to be placed into a container containing water by sinking the sponge into the water. The container now having the sponge thereinside is then put into a vacuum vessel, and a pressure inside such vacuum vessel is reduced to 10 mmHg or lower.

(3) After the pressure inside the vacuum vessel has been restored to normal pressure, the container is then left for 5 min to allow the sponge to absorb the water.

(4) The mass of the sponge that has absorbed the water is measured.

Next, the open cell ratio is calculated based on the following calculation formula.

Open cell ratio (%)=[(mass of sponge that has absorbed water−mass of sponge)/specific gravity of water]/[(1−(specific gravity of sponge/specific gravity of rubber before foaming))× (mass of sponge/specific gravity of sponge)]× 100

Particularly, in the above formula, the specific gravity of water was set to be 1.00.

Further, it is preferred that the open cell ratio of the silicone rubber sponge of the present invention that is obtained by the above production method be 110 to 1,000%, particularly preferably 120 to 500%. The foaming ratio refers to a value calculated by "specific gravity of rubber before foaming/specific gravity of sponge×100(%);" specific gravities are values measured by the method described in JIS K 6268:1998.

In addition, with regard to the silicone rubber sponge produced by the production method of the present invention, the aspect ratio of the sponge cells is 1.0 to 1.3, preferably 1.0 to 1.2; and an average cell diameter of the sponge cells is not larger than 250 μm, preferably 30 to 200 μm. Here, in this invention, the aspect ratio and average cell diameter of the sponge cells are measured using an optical microscope. Specifically, cells on an arbitrary cross-section of the sponge were observed by the optical microscope, followed by measuring the diameters of an arbitrary number of the cells, and then calculating the average cell diameter as an average value. Similarly, cells on an arbitrary cross-section of the sponge were observed by the optical microscope, followed by measuring both the major and minor diameters of an arbitrary number of the cells, and then calculating the aspect ratio as an average value of values obtained by dividing the major diameters of the cells by the minor diameters thereof.

This type of silicone rubber sponge is useful in the production of an electrophotographic imaging member (especially, a fixing member, a drive roller, a paper feeding/discharging roller and a pressure pad) having at least one layer that is composed of such sponge. Examples of a fixing member include a single-layered fixing roller having one layer that is composed of such sponge; a multiple-layered fixing roller having at least two layers that are composed of such sponge; a fixing belt; and a fixing pad. Examples of a multiple-layered fixing roller include a multiple-layered fixing roller with a surface layer mold-releasing material such as a PFA tube being attached thereto; and a multilayered fixing roller for melting and fixing a toner, such multilayered fixing roller having a solid rubber layer, a layer composed of the aforesaid sponge, and a toner mold-releasing layer.

Examples of a drive roller include a belt drive roller.

Further, the silicone rubber sponge of the invention can be used as a sponge gasket for transportation carriers such as vehicles, railway trains, aircrafts and vessels; a space sponge gasket; and a sponge gasket for construction purpose. Furthermore, the silicone rubber sponge of the invention can also be used as a protective buffer material, a seating sponge, a sound absorbing sponge, and a flame-retardant sponge.

Working Example

The present invention is described in detail hereunder with reference to working and comparative examples. However, the invention is not limited to the following working examples.

The components used in the working and comparative examples are as follows.

<(A)+(B) Components: Base Rubber Composition 1>
A kneader was used to combine:
100 parts by mass of a dimethylpolysiloxane with both ends blocked by dimethylvinylsilyl groups, and having 10 methylvinylsiloxane units and an average polymerization degree of about 8,000;
40 parts by mass of a dry silica "Aerosil 200" (by Japan Aerosil Co., Ltd.) having a BET surface area of 200 m$^2$/g; and
5 parts by mass of a dimethylpolysiloxane having a silanol group at both ends and viscosity of 29 mm$^2$/s (23° C.), followed by performing a heat treatment at 180° C. for two hours to obtain a base rubber composition 1.

<(A)+(B) Components: Base Rubber Composition 2>
A kneader was used to combine:
100 parts by mass of a dimethylpolysiloxane with both ends blocked by trimethylsilyl groups, and having 15 methylvinylsiloxane units and an average polymerization degree of about 6,000; and
15 parts by mass of a dry silica "Aerosil 200" (by Japan Aerosil Co., Ltd.) having a BET surface area of 200 m$^2$/g, followed by performing a heat treatment at 180° C. for two hours to obtain a base rubber composition 2.

<Component (C): Thermally Expandable Microcapsules>
C1: Thermally expandable microcapsules having outer shells made of a polyacrylonitrile resin (molecular weight 1,200,000); and containing, as a solvent, 10% by mass of isobutane and 10% by mass of isopentane thereinside.

C2: Thermally expandable microcapsules having outer shells made of a polyacrylonitrile resin (molecular weight 1,200,000); and containing, as a solvent, 25% by mass of isopentane thereinside.

C3: Thermally expandable microcapsules having outer shells made of a polyacrylonitrile resin (molecular weight 1,200,000); and containing, as a solvent, 10% by mass of isobutane and 5% by mass of isopentane thereinside.

C4: Thermally expandable microcapsules having outer shells made of a polyacrylonitrile resin (molecular weight 1,200,000); and containing, as a solvent, 10% by mass of isopentane and 18% by mass of n-hexane thereinside.

C5: Thermally expandable microcapsules (for use in comparative example) having outer shells made of a vinylidene chloride-acrylonitrile copolymer resin (molecular weight 1,500,000); and containing, as a solvent, 25% by mass of isobutane thereinside.

C6: Thermally expandable microcapsules (for use in comparative example) having outer shells made of a polyacrylonitrile resin (molecular weight 1,200,000); and containing, as a solvent, 18% by mass of n-hexane thereinside.

Here, molecular weight refers to a value obtained as a number average molecular weight in terms of polystyrene in a gel permeation chromatography (GPC) analysis using THF as a developing solvent. Further, the amount of each solvent is expressed as "% by mass" per the total amount of the microcapsules as 100.

The details of the properties of C1 to C6 are shown in Table 1. The value of each property was measured by the aforementioned methods.

TABLE 1

|    | Particle size before expansion (μm) | Expansion starting temperature (° C.) | Expansion ending temperature (° C.) | Maximum expansion ratio (Times) | Volume contraction ratio (%) |
|----|---|---|---|---|---|
| C1 | 30 | 110 | 150 | 90  | 60 |
| C2 | 20 | 120 | 180 | 110 | 40 |
| C3 | 60 | 90  | 140 | 40  | 60 |
| C4 | 40 | 150 | 180 | 50  | 30 |
| C5 | 30 | 80  | 120 | 110 | 70 |
| C6 | 30 | 160 | 210 | 40  | 6  |

<Component (D): Curing Agent>
D1: 2,5-dimethyl-2,5-di-(t-butylperoxy)hexane (6-min half-life temperature: 160° C.)
D2: Dicumylperoxide (6-min half-life temperature: 154° C.)
D3: Cumyl-t-butylperoxide (6-min half-life temperature: 148° C.)
D4: bis(2,4-dichlorobenzoyl)peroxide (6-min half-life temperature: 99° C.) (for use in comparative example)
Addition: Addition-curing agents C-25A (platinum catalyst)/C-25B (organohydrogenpolysiloxane) (for comparison)
(All of the above agents are produced by Shin-Etsu Chemical Co., Ltd., and are capable of curing the base rubber compositions at 120° C. in about 30 sec.)

<Component (E): Open Cell-Forming Agent>
E1: Azodicarbonamide (pure form, decomposition starting temperature 210° C.)
E2: Urea-containing azodicarbonamide (purity 95%, decomposition starting temperature 190° C.)
E3: N,N'-dinitrosopentamethylenetetramine (pure form, decomposition starting temperature 205° C.)
E4: Hydrazodicarbonamide (pure form, decomposition starting temperature 245° C.)

E5: Azobisisobutyronitrile (decomposition starting temperature 107° C.) (for comparison)

E6: Urea- and organic zinc-containing azodicarbonamide (purity 88%, decomposition starting temperature 140° C.) (for comparison)

Evaluation Methods in Working and Comparative Examples are as Follows.

Hardness: Asker C hardness as specified in JIS S 6050:2008 was measured.

Foaming ratio: The specific gravity of an uncrosslinked rubber composition sheet (rubber specific gravity before foaming) and the specific gravity of a silicone rubber sponge after post-curing (sponge specific gravity) were measured in each of the examples below.

Here, the specific gravities were measured by the method described in JIS K 6268:1998. Foaming ratios were then calculated based on the following formula.

[Calculation method: rubber specific gravity before foaming/sponge specific gravity×100(%)]

Cell condition: Abnormal foaming, breakage and the condition of the skin layer were studied. "Favorable" was given to examples where abnormal foaming or breakage was not confirmed visually, and where an excellent surface smoothness of the skin layer was observed.

Average cell diameter: Cells on an arbitrary cross-section of the sponge were observed by an optical microscope to measure the cell diameters and then calculate an average value thereof.

Aspect ratio of cells: Cells on an arbitrary cross-section of the sponge were observed by an optical microscope to measure the major and minor diameters thereof, and then calculate an average value of the values obtained by dividing the major diameters of the cells by the minor diameters thereof.

Open cell ratio: The open cell ratio of the sponge was measured by the following procedures.

(1) The specific gravities and masses of the uncrosslinked rubber composition sheet (rubber before foaming) and the silicone rubber sponge after post-curing (sponge) were measured.

Here, the specific gravity measurement was carried out by a method described in JIS K 6268:1998, provided that a water immersion time when performing such specific gravity measurement was within 5 sec.

(2) The sponge was placed into a container containing water by sinking the sponge into the water. The container now having the sponge thereinside is then put into a vacuum vessel, and a pressure inside such vacuum vessel was reduced to 10 mmHg or lower.

(3) After the pressure inside the vacuum vessel had been restored to normal pressure, the container was then left for 5 min to allow the sponge to absorb the water.

(4) The mass of the sponge that had absorbed the water was measured.

Next, the open cell ratio was calculated based on the following formula.

Open cell ratio (%)=[(mass of sponge that has absorbed water−mass of sponge)/specific gravity of water]/[(1−(specific gravity of sponge/specific gravity of rubber before foaming))×(mass of sponge/specific gravity of sponge)]×100

Particularly, in the above formula, the specific gravity of water was set to be 1.00.

Working Example 1

In a double roll mill, added to and mixed with 145 parts by mass of the base rubber composition 1 were 3.0 parts by mass of the thermally expandable microcapsules (C1), 1.5 parts by mass of the 2,5-dimethyl-2,5-di-(t-butylperoxy)hexane as the curing agent (D1), and 7.0 parts by mass of the azodicarbonamide as the open cell-forming agent (E1) (theoretical gas generation amount 1,400 cc), thereby obtaining an uncrosslinked rubber composition sheet having a thickness of 9 mm.

Next, this uncrosslinked rubber composition sheet having the thickness of 9 mm was subjected to hot air vulcanization in a hot-air dryer at 230° C. for 30 min, thus obtaining a silicone rubber sponge.

Later, the silicone rubber sponge prepared was subjected to post-curing at 230° C. for two hours. The condition of the cells of a sponge thus obtained was confirmed and evaluated as above; and after removing the skin layer, studied as above were the hardness, foaming ratio, average cell diameter, cell aspect ratio (sphericity) and open cell ratio of the sponge. The evaluation results thereof are shown in Table 2.

Further, FIG. 1 is an enlarged photograph showing a cross-section of the sponge obtained in the working example 1. It became clear that the sponge of the working example 1 had uniform and finely structured cells.

Working Example 2

In a double roll mill, added to and mixed with 145 parts of the base rubber composition 1 were 2.3 parts by mass of the thermally expandable microcapsules (C2), 1.2 parts by mass of the dicumylperoxide as the curing agent (D2), and 3.5 parts by mass of the urea-containing azodicarbonamide as the open cell-forming agent (E2) (theoretical gas generation amount 690 cc), followed by producing a sponge in a similar manner as the working example 1. Later, this sponge was evaluated also in a similar manner as the working example 1, and the evaluation results thereof are shown in Table 2.

Working Example 3

In a double roll mill, added to and mixed with 145 parts by mass of the base rubber composition 1 were 3.0 parts by mass of the thermally expandable microcapsules (C3), 1.8 parts by mass of the cumyl-t-butylperoxide as the curing agent (D3), and 4.5 parts by mass of the N,N"-dinitrosopentamethylenetetramine as the open cell-forming agent (E3) (theoretical gas generation amount 1,100 cc), followed by producing a sponge in a similar manner as the working example 1. Later, this sponge was evaluated also in a similar manner as the working example 1, and the evaluation results thereof are shown in Table 2.

Working Example 4

In a double roll mill, added to and mixed with 145 parts by mass of the base rubber composition 1 were 2.3 parts by mass of the thermally expandable microcapsules (C4), 1.5 parts by mass of the 2,5-dimethyl-2,5-di-(t-butylperoxy)hexane as the curing agent (D1), and 7.0 parts by mass of the azodicarbonamide as the open cell-forming agent (E1) (theoretical gas generation amount 1,400 cc), followed by producing a sponge in a similar manner as the working example 1. Later, this sponge was evaluated also in a similar manner as the working example 1, and the evaluation results thereof are shown in Table 2.

Working Example 5

In a double roll mill, added to and mixed with 145 parts by mass of the base rubber composition 1 were 3.0 parts by mass of the thermally expandable microcapsules (C1), 1.5 parts by mass of the 2,5-dimethyl-2,5-di-(t-butylperoxy) hexane as the curing agent (D1), and 3.0 parts by mass of the hydrazodicarbonamide as the open cell-forming agent (E4) (theoretical gas generation amount 530 cc), followed by producing a sponge in a similar manner as the working example 1. Later, this sponge was evaluated also in a similar manner as the working example 1, and the evaluation results thereof are shown in Table 2.

Working Example 6

In a double roll mill, added to and mixed with 115 parts by mass of the base rubber composition 2 were 2.3 parts by mass of the thermally expandable microcapsules (C1), 1.2 parts by mass of the 2,5-dimethyl-2,5-di-(t-butylperoxy) hexane as the curing agent (D1), and 6.0 parts by mass of the azodicarbonamide as the open cell-forming agent (E1) (theoretical gas generation amount 1,000 cc), followed by producing a sponge in a similar manner as the working example 1. Later, this sponge was evaluated also in a similar manner as the working example 1, and the evaluation results thereof are shown in Table 2.

Comparative Example 1

In a double roll mill, added to and mixed with 145 parts by mass of the base rubber composition 1 were 3.0 parts by mass of the thermally expandable microcapsules (C1), 1.5 parts by mass of the 2,5-dimethyl-2,5-di-(t-butylperoxy) hexane as the curing agent (D1), and 1.5 parts by mass of the azobisisobutyronitrile as the open cell-forming agent (E5) (theoretical gas generation amount 200 cc), followed by producing a sponge in a similar manner as the working example 1. Later, this sponge was evaluated also in a similar manner as the working example 1, and the evaluation results thereof are shown in Table 2.

Comparative Example 2

In a double roll mill, added to and mixed with 145 parts by mass of the base rubber composition 1 were 3.0 parts by mass of the thermally expandable microcapsules (C1); 0.7 parts by mass of the addition-crosslinking curing agent C-25A and 3.0 parts by mass of the addition-crosslinking curing agent C-25B, as curing agents; and 1.5 parts by mass of the azobisisobutyronitrile as the open cell-forming agent (E5) (theoretical gas generation amount 200 cc), followed by producing a sponge in a similar manner as the working example 1. Later, this sponge was evaluated also in a similar manner as the working example 1, and the evaluation results thereof are shown in Table 2.

Comparative Example 3

In a double roll mill, added to and mixed with 145 parts by mass of the base rubber composition 1 were 3.0 parts by mass of the thermally expandable microcapsules (C1); 0.7 parts by mass of the addition-crosslinking curing agent C-25A and 3.0 parts by mass of the addition-crosslinking curing agent C-25B, as curing agents; and 1.5 parts by mass of the azodicarbonamide as the open cell-forming agent (E1) (theoretical gas generation amount 300 cc), followed by attempting to produce a sponge in a similar manner as the working example 1. However, a sponge could not be obtained due to the fact that the azodicarbonamide acted as an addition-crosslinking inhibitor.

Comparative Example 4

In a double roll mill, added to and mixed with 145 parts by mass of the base rubber composition 1 were 3.0 parts by mass of the thermally expandable microcapsules (C5), 1.5 parts by mass of the 2,5-dimethyl-2,5-di-(t-butylperoxy) hexane as the curing agent (D1), and 3.0 parts by mass of the azodicarbonamide as the open cell-forming agent (E1) (theoretical gas generation amount 600 cc), followed by attempting to produce a sponge in a similar manner as the working example 1. However, open cells could not be formed after crosslinking, and the sponge greatly cracked from within due to the gas generated by the azodicarbonamide. Later, this sponge was evaluated also in a similar manner as the working example 1, and the evaluation results thereof are shown in Table 2.

Comparative Example 5

In a double roll mill, added to and mixed with 145 parts by mass of the base rubber composition 1 were 3.0 parts by mass of the thermally expandable microcapsules (C1), 1.5 parts by mass of the 2,5-dimethyl-2,5-di-(t-butylperoxy) hexane as the curing agent (D1), and 7.0 parts by mass of the urea- and organic zinc-containing azodicarbonamide as the open cell-forming agent (E6) (theoretical gas generation amount 1,000 cc), followed by attempting to produce a sponge in a similar manner as the working example 1. However, the sponge expanded from within in a dome-like manner, and then ruptured. Later, this sponge was evaluated also in a similar manner as the working example 1, and the evaluation results thereof are shown in Table 2.

Comparative Example 6

In a double roll mill, added to and mixed with 145 parts by mass of the base rubber composition 1 were 3.0 parts by mass of the thermally expandable microcapsules (C1), 1.0 part by mass of the bis(2,4-dichlorobenzoyl)peroxide as the curing agent (D4) and as a low temperature decomposition-type organic peroxide, and 3.0 parts by mass of the azodicarbonamide as the open cell-forming agent (E1) (theoretical gas generation amount 600 cc), followed by attempting to produce a sponge in a similar manner as the working example 1. However, a large number of cracks each having a length of 0.5 to 3 cm and a width of 0.5 to 2 mm were formed inside the sponge; the sponge thus had a poor appearance. Later, this sponge was evaluated also in a similar manner as the working example 1, and the evaluation results thereof are shown in Table 2.

Comparative Example 7

In a double roll mill, added to and mixed with 145 parts by mass of the base rubber composition 1 were 3.0 parts by mass of the thermally expandable microcapsules (C6), 1.5 parts by mass of the 2,5-dimethyl-2,5-di-(t-butylperoxy) hexane as the curing agent (D1), and 3.6 parts by mass of the azodicarbonamide as the open cell-forming agent (E1) (theoretical gas generation amount 720 cc), followed by attempting to produce a sponge in a similar manner as the working example 1. However, large pinholes each having a diameter of 1 to 3 mm were formed inside the sponge; the sponge thus had a poor appearance. Later, this sponge was evaluated also in a similar manner as the working example 1, and the evaluation results thereof are shown in Table 2.

TABLE 2

| | Component (part by mass) | Working example 1 | 2 | 3 | 4 | 5 | 6 | Comparative example 1 |
|---|---|---|---|---|---|---|---|---|
| A | Dimethylpolysiloxane with both ends blocked by dimethylvinylsilyl groups (Average polymerization degree: about 8,000) | 100 | 100 | 100 | 100 | 100 | | 100 |
| | Dimethylpolysiloxane with both ends blocked by trimethylsilyl groups (Average polymerization degree: about 6,000) | | | | | | 100 | |
| B | Reinforcing silica | 40 | 40 | 40 | 40 | 40 | 15 | 40 |
| Dispersant | Low-molecular dimethylpolysiloxane with both ends blocked by silanol groups | 5 | 5 | 5 | 5 | 5 | 0 | 5 |
| C | C1 | 3.0 | | | | 3.0 | 2.3 | 3.0 |
| | C2 | | 2.3 | | | | | |
| | C3 | | | 3.0 | | | | |
| | C4 | | | | 2.3 | | | |
| | C5 | | | | | | | |
| | C6 | | | | | | | |
| D | D1 | 1.5 | | | 1.5 | 1.5 | 1.2 | 1.5 |
| | D2 | | 1.2 | | | | | |
| | D3 | | | 1.8 | | | | |
| | D4 | | | | | | | |
| | Addition | | | | | | | |
| E | E1 | 7.0 | | | 7.0 | | 6.0 | |
| | E2 | | 3.5 | | | | | |
| | E3 | | | 4.5 | | | | |
| | E4 | | | | | 3.0 | | |
| | E5 | | | | | | | 1.5 |
| | E6 | | | | | | | |
| | Hardness (Asker C) | 42 | 40 | 34 | 46 | 45 | 35 | 15 |
| | Foaming ratio (%) | 280 | 370 | 420 | 210 | 230 | 300 | 600 |
| | Cell condition | Favorable | Favorable | Favorable | Favorable | Favorable | Favorable | Favorable |
| | Average cell diameter (μm) | 80 | 80 | 90 | 120 | 80 | 80 | 80 |
| | Cell aspect ratio | 1.1 | 1.1 | 1.1 | 1.2 | 1.1 | 1.1 | 1.6 |
| | Open cell ratio (%) | 75 | 85 | 65 | 48 | 42 | 85 | 5 |
| | Special note | | | | Certain number of pinholes | | | |

| | | Component (part by mass) | Comparative example 2 | 3 | 4 | 5 | 6 | 7 |
|---|---|---|---|---|---|---|---|---|
| | A | Dimethylpolysiloxane with both ends blocked by dimethylvinylsilyl groups (Average polymerization degree: about 8,000) | 100 | 100 | 100 | 100 | 100 | 100 |
| | | Dimethylpolysiloxane with both ends blocked by trimethylsilyl groups (Average polymerization degree: about 6,000) | | | | | | |
| | B | Reinforcing silica | 40 | 40 | 40 | 40 | 40 | 40 |
| | Dispersant | Low-molecular dimethylpolysiloxane with both ends blocked by silanol groups | 5 | 5 | 5 | 5 | 5 | 5 |
| | C | C1 | 3.0 | 3.0 | | 3.0 | 3.0 | |
| | | C2 | | | | | | |
| | | C3 | | | | | | |
| | | C4 | | | | | | |
| | | C5 | | | 3.0 | | | |
| | | C6 | | | | | | 3.0 |
| | D | D1 | | | 1.5 | 1.5 | | 1.5 |
| | | D2 | | | | | | |
| | | D3 | | | | | | |
| | | D4 | | | | | 1.0 | |
| | | Addition | 0.7/3.0 | 0.7/3.0 | | | | |
| | E | E1 | | 1.5 | 3.0 | | 3.0 | 3.6 |
| | | E2 | | | | | | |

TABLE 2-continued

|  |  |  |  |  |  |  |
|---|---|---|---|---|---|---|
| E3 |  |  |  |  |  |  |
| E4 |  |  |  |  |  |  |
| E5 | 1.5 |  |  |  |  |  |
| E6 |  |  |  | 7.0 |  |  |
| Hardness (Asker C) | 14 | — | 30 | 22 | 55 | 44 |
| Foaming ratio (%) | 520 | — | 220 | 310 | 180 | Breakage |
| Cell condition | Favorable | — | Breakage | Breakage | Favorable | Breakage |
| Average cell diameter (μm) | 80 | — | 60 | 300 | 80 | 800 |
| Cell aspect ratio | 1.8 | — | 1.4 | 1.7 | 1.1 | 1.6 |
| Open cell ratio (%) | 3 | — | 5 | 16 | 18 | 37 |
| Special note |  | Uncured | Breakage | Dome-like rupture | Rupture inside sponge | Pinholes and rupture |

In the comparative examples 4 and 7 where the thermally expandable microcapsules used as the component (C) had expansion starting temperatures outside the ranges as prescribed by the present invention, breakages and pinholes occurred in the sponge, and low open cell ratios were observed as well.

In the comparative example 3 where the addition-crosslinking agent was used as the component (D), the sponge did not cure. Further, even if employing an organic peroxide crosslinking agent, such as in the case of the comparative example 6 where the organic peroxide crosslinking agent used as the component (D) had a crosslinking starting temperature lower than the expansion starting temperature of the component (C), the sponge ruptured from within, and a low open cell ratio was observed as well.

In the comparative example 1 where the decomposition starting temperature of the component (E) was lower than the expansion starting temperature of the component (C), a low open cell ratio was observed, and the aspect ratio of the cells was high i.e. there could not be obtained a sponge having truly spherical cells among which open cells were present at a high ratio. Further, even when the decomposition starting temperature of the open cell-forming agent as the component (E) is higher than the thermal expansion starting temperature of the component (C), in the comparative example 5 where the decomposition starting temperature of the open cell-forming agent used as the component (E) was lower than the crosslinking starting temperature of the component (D), the sponge exhibited a dome-like rupture(s).

Meanwhile, it became clear that the sponges obtained in the working examples 1 to 6 where the various temperatures of the components used were in the ranges prescribed by the present invention, each had a uniform fine-cell structure containing open cells at a high ratio.

Comparative Example 8

In a double roll mill, added to and mixed with 145 parts by mass of the base rubber composition 1 were 3.0 parts by mass of the thermally expandable microcapsules (C1) and 1.5 parts by mass of the 2,5-dimethyl-2,5-di-(t-butylperoxy) hexane as the curing agent (D1), thereby producing a sponge containing no open cell-forming agent in a similar manner as the working example 1. A photograph of the sponge thus obtained was compared to that of the working example 1. Further, the sponge prepared was cut out into a size of diameter 29 mm×thickness 12.5 mm, and a compression set thereof was measured by a method described in JIS K 6262:2013 (180° C., 25% compression, 22 hours). The results are shown in Table 3.

TABLE 3

Figure 2A:
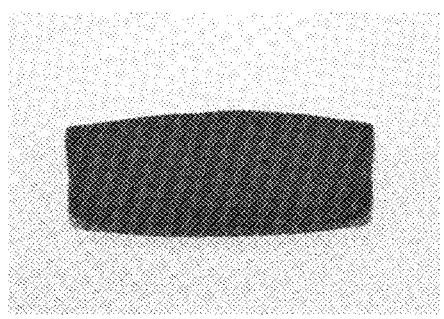
FIG. 2A is a photograph appearance of an open cell of working example 1.
Figure 2B:
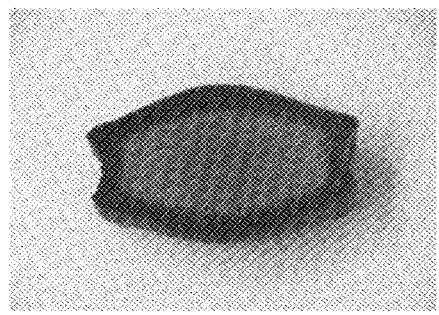
FIG. 2B is a photograph appearance of a closed cell of comparative example 8.

|  |  | Working example 1 | Comparative example 8 |
|---|---|---|---|
| Component (part by mass) | (A + B) Base rubber composition 1 | 145 | 145 |
|  | (C) Thermally expandable microcapsules | 3 | 3 |
|  | (D) Curing agent | 1.5 | 1.5 |
|  | (E) Open cell-forming agent | 7 | 0 |
| Property | Hardness (Asker C) | 42 | 54 |
|  | Forming ratio (%) | 280 | 220 |
|  | Cell condition | Favorable | Favorable |
|  | Average cell diameter (μm) | 80 | 80 |
|  | Open cell ratio (%) | 75 (Open cell) | 4 (Closed cell) |
|  | Compression set (%) | 12 | 70 |
|  | Shape | Open cells allowed oxygen to reach to the center of the sponge; the resin of the thermally expandable microcapsules was then oxidized and deteriorated to achieve a uniform fine open-cell state exhibiting a uniformity even inside the sponge. | Closed cells prevented oxygen from reaching to the center of the sponge; the resin of the thermally expandable microcapsules charred over a range of 6 mm from the surface layer. The sponge had a non-uniform shape and a drum-like bulge in the central part thereof. |
|  | Appearance | Shown in FIG. 2A | Shown in FIG. 2B |

[Production of Fixing Roller]

Produced was a single-layered silicone rubber sponge roller having a size of outer diameter 30 mm×length 250 mm, the roller comprising an aluminum core metal of a size of diameter 6 mm×length 300 mm, and the sponge of the working example 1 or comparative example 2 with which the outer circumference of the core metal was coated. After abrading this roller down to a size of: diameter 26 mm, a fluorine PFA tube having a film thickness of 50 μm and its inner surface treated with an addition-crosslinking-type one-component silicone rubber adhesive agent KE-1884 (by Shin-Etsu Chemical Co., Ltd.) was used to coat the roller abraded, followed by heating and curing the same at 150° C. for 30 min, and then performing post-curing thereon at 200° C. for four hours, thereby obtaining a PFA resin-coated silicone rubber sponge fixing roller having a size of outer diameter 26 mm×length 250 mm.

[Evaluation of Fixing Roller]

An outer diameter of the obtained fixing roller under an atmosphere of 23° C. was measured using a laser displacement meter (CMOS Laser application sensor IL-S100+ Amplifier unit IL-1000 (by KEYENCE CORPORATION)). Further, measured in a similar manner was an outer diameter of the obtained fixing roller that had air-inflated after being placed in a hot-air dryer of 200° C. for 15 sec.

Table 4 shows the outer diameters measured; and rates of change in outer diameter that were calculated based on these outer diameters. The fixing roller employing the composition of the working example 1 exhibited a rate of change in outer diameter of about 2%, whereas the fixing roller employing the composition of the comparative example 2 exhibited a rate of change in outer diameter of about 5%, and was thus found to have exhibited a largely expanded outer diameter. The fixing roller employing the composition of the comparative example 2 exhibited a change in outer diameter to an extent that fixing failures such as character blurring could have occurred at the time of use.

TABLE 4

| | 23° C. Outer diameter | 200° C. Outer diameter | Rate of change in outer diameter (%) |
|---|---|---|---|
| Fixing roller employing composition of working example 1 | 26.26 mm | 26.78 mm | 1.98 |
| Fixing roller employing composition of comparative example 2 | 26.33 mm | 27.65 mm | 5.01 |

[Production of flame-retardant silicone sponge sheet]

Working Example 7

In a double roll mill, added to and mixed with 145 parts by mass of the base rubber composition 1 were 3.0 parts by mass of the thermally expandable microcapsules (C1); 1.5 parts by mass of the curing agent (D1); and 7.0 parts by mass of the open cell-forming agent (E1) (components in the working example 1 so far); as well as 0.6 parts by mass of, a 5% chloroplatinic acid isopropylalcohol solution for imparting a flame retardancy to the sponge; 60 parts by mass of CRYSTALITE VX-S(by TATSUMORI LTD.) as a crystalline silica having an average particle size of 4 μm; and 7 parts by mass of SUPER-TITANIA F-2 (by SHOWA DENKO K.K.) as a titanium oxide having a specific surface area of 30 m$^2$/g, thereby producing an uncrosslinked rubber composition sheet having a thickness of 3 mm.

Next, this uncrosslinked rubber composition sheet having the thickness of 3 mm was subjected to hot air vulcanization in a hot-air dryer at 230° C. for 30 min, thereby obtaining a silicone rubber sponge having, a thickness of 6 mm. Later, the silicone rubber sponge obtained was post-cured at 230° C. for two hours.

As a result of performing a sponge UL flame resistance test (ASTM D 4986) on the sponge obtained, the flame on the sponge immediately disappeared after removing the burner, and the sponge obtained was thus regard as that having the grade of UL 94 HF-1.

Further, the hardness (Asker C) and open cell ratio of the sponge obtained were measured by methods similar to those described above. Furthermore, the density of the sponge obtained was measured in accordance with JIS K6268. The results thereof are shown in Table 5.

Comparative Example 9

A silicone rubber sponge was obtained by a method similar to that of the working example 7, in which combined were the same amounts of all the components except for the open cell-forming agent (E1) that were employed in the working example 7. Later, the silicone rubber sponge obtained was post-cured at 230° C. for two hours.

As a result of performing a sponge UL, flame resistance test (ASTM D 4986) on the sponge obtained, glowing combustion continued even after removing the burner, and the combustion lasted 10 sec or longer. The combustion speed was 36 mm/min, and there were observed no dripping products from the combustion. The sponge obtained was thus regard as that having the grade of UL 94 HBF. Further, the sponge was evaluated in a similar manner as the working example 7, and the results thereof are shown in Table 5.

From the results of the working example 7 and comparative example 9, it became clear that even the sponge employing the thermally expandable microcapsules was able to exhibit an unimpaired flame retardancy if produced by the sponge production method of the invention.

TABLE 5

| | Hardness (Asker C) | Density (g/cm$^3$) | Open cell ratio (%) | UL flame resistance |
|---|---|---|---|---|
| Sponge of working example 7 | 47 | 0.52 | 38 (Open cell) | 94HF-1 |
| Sponge of comparative example 9 | 54 | 0.54 | 6 (Closed cell) | 94HBF |

As is clear from the working and comparative examples, the present invention makes it possible to obtain a silicone rubber sponge having a uniform fine-cell structure that contains open cells at a high ratio, and exhibiting a small compression set, by only performing hot air vulcanization (HAV).

The invention claimed is:

1. A method for producing a millable silicone rubber sponge with an open cell ratio of not lower than 20%, comprising:
heat-treating a silicone rubber composition at 200° C. or higher, the silicone rubber composition containing:
(A) 100 parts by mass of an organopolysiloxane having at least two alkenyl groups in one molecule and a polymerization degree of not lower than 3,000, the organopolysiloxane being represented by the following average composition formula (I)

$$R^1_a SiO_{4-a/2} \tag{I}$$

wherein $R^1$ represents an identical or different monovalent hydrocarbon group, and a represents a positive number of 1.95 to 2.04;

(B) a reinforcing silica in an amount of 10 to 100 parts by mass per 100 parts by mass of the component (A);

(C) thermally expandable microcapsules exhibiting an expansion starting temperature of 90 to 150° C., and contracting from a maximum expansion volume by 20% or more when heated at 200° C. for 5 min, the thermally expandable microcapsules being in an amount of 0.1 to 20 parts by mass per 100 parts by mass of the component (A); and (D) a curing agent which is an organic peroxide in an amount of 0.01 to 20 parts by mass per 100 parts by mass of the component (A); and (E) an open cell-forming agent which is a solid high temperature decomposition-type organic foaming agent having a decomposition starting temperature of not lower than 180° C., and starting to decompose after the component (A) is cured, the open cell-forming agent being in an amount of 0.1 to 30 parts by mass per 100 parts by mass of the component (A).

2. The method for producing the tillable silicone rubber sponge according to claim 1, wherein the heat treating is performed with atmospheric hot air.

3. The method for producing the millable silicone rubber sponge according to claim 1, wherein an amount of a gas generated by the open cell-forming agent as the component (E) is not smaller than 100 cc per 100 g of a sum total of the components (A) and (B).

4. The method for producing the millable silicone rubber sponge according to claim 1, wherein the open cell-forming agent (E) comprises at least one selected from azodicarbonamide, N,N'-dinitrosopentamethylenetetramine and hydrazodicarbonamide.

5. The method for producing the millable silicone rubber sponge according to claim 1, wherein the curing agent (D) is a dialkyl-based organic peroxide having a crosslinking starting temperature of 135 to 180° C.

6. A millable silicone rubber sponge with an open cell ratio of not lower than 20%, a cell aspect ratio of 1.0 to 1.3 and an average cell diameter of not larger than 250 µm, the millable silicone rubber sponge being a heat-treated product of a silicone rubber composition containing:

(A) 100 parts by mass of an organopolysiloxane having at least two alkenyl groups in one molecule and a polymerization degree of not lower than 3,000, the organopolysiloxane being represented by the following average composition formula (I)

$$R^1_a SiO_{4-a/2} \tag{I}$$

wherein R represents an identical or different monovalent hydrocarbon group, and a represents a positive number of 1.95 to 2.04;

(B) a reinforcing silica in an amount of 10 to 100 parts by mass per 100 parts by mass of the component (A);

(C) thermally expandable microcapsules exhibiting an expansion starting temperature of 90 to 150° C., and contracting from a maximum expansion volume by 20% or more when heated at 200° C. for 5 min, the thermally expandable microcapsules being in an amount of 0.1 to 20 parts by mass per 100 parts by mass of the component (A);

(D) a curing agent which is an organic peroxide in an amount of 0.01 to 20 parts by mass per 100 parts by mass of the component (A); and (E) an open cell-forming agent which is a solid high temperature decomposition-type organic foaming agent having a decomposition starting temperature of not lower than 180° C., and starting to decompose after the component (A) is cured, the open cell-forming agent being in an amount of 0.1 to 30 parts by mass per 100 parts by mass of the component (A).

7. A belt-shaped molded product comprising the millable silicone rubber sponge as set forth in claim 6.

8. A sheet-shaped molded product comprising the millable silicone rubber sponge as set forth in claim 6.

9. A sponge roller-shaped molded product comprising the millable silicone rubber sponge as set forth in claim 6.

10. A protective buffer material for transportation carriers, comprising the millable silicone rubber sponge as set forth in claim 6.

11. The method for producing the millable silicone rubber sponge according to claim 2, wherein an amount of a as generated by the open cell-forming agent as the component (E) is not smaller than 100 cc per 100 g of a sum total of the components (A) and (B).

* * * * *